United States Patent

Bhattacharya et al.

Patent Number: 5,462,647
Date of Patent: Oct. 31, 1995

[54] PREPARATION OF LEAD-ZIRCONIUM-TITANIUM FILM AND POWDER BY ELECTRODEPOSITION

[75] Inventors: Raghu N. Bhattacharya, Littleton; David S. Ginley, Evergreen, both of Colo.

[73] Assignee: Midwest Research Institute, Kansas City, Mo.

[21] Appl. No.: 303,430

[22] Filed: Sep. 9, 1994

[51] Int. Cl.$^6$ .................................................. C25C 5/02
[52] U.S. Cl. .................. 205/74; 204/105 R; 204/123; 75/612
[58] Field of Search ................. 204/105 R, 96, 204/123, 59 R, 64 T; 205/50, 80, 104, 103, 74; 75/612

[56] References Cited

U.S. PATENT DOCUMENTS

| | | | |
|---|---|---|---|
| 3,607,675 | 9/1971 | Haines | 427/132 |
| 3,836,436 | 9/1974 | Rivola et al. | 205/74 |
| 3,843,491 | 10/1974 | Piro et al. | 205/74 |
| 3,994,785 | 11/1976 | Rippere | 205/74 |
| 4,046,643 | 9/1977 | Rippere | 205/103 |
| 4,330,375 | 5/1982 | Wörz | 134/1 |
| 4,882,014 | 11/1989 | Coyle | 204/1.5 |

OTHER PUBLICATIONS

W. E. Reid, et al., "Electrodeposition of Metals from Organic Soln's: III," *J. Electrochem. Soc.* v. 104 No. 1 pp. 21–29 (Jan. 1957).

A. Brenner, "Electrodeposition of Metals from Organic Soln's: I," *J. Electrochem. Soc.* v. 103 No. 12 pp. 652–656 (Dec. 1965).

*Primary Examiner*—John Niebling
*Assistant Examiner*—Brendan Mee
*Attorney, Agent, or Firm*—Edna M. O'Connor

[57] ABSTRACT

A process for the preparation of lead-zirconium-titanium (PZT) film and powder compositions. The process comprises the steps of providing an electrodeposition bath, providing soluble salts of lead, zirconium and titanium metals to this bath, electrically energizing the bath to thereby direct ions of each respective metal to a substrate electrode and cause formation of metallic particles as a recoverable film of PZT powder on the electrode, and also recovering the resultant film as a powder. Recovery of the PZT powder can be accomplished by continually energizing the bath to thereby cause powder initially deposited on the substrate-electrode to drop therefrom into the bath from which it is subsequently removed. A second recovery alternative comprises energizing the bath for a period of time sufficient to cause PZT powder deposition on the substrate-electrode only, from which it is subsequently recovered. PZT film and powder so produced can be employed directly in electronic applications, or the film and powder can be subsequently oxidized as by an annealing process to thereby produce lead-zirconium-titanium oxide for use in electronic applications.

26 Claims, 4 Drawing Sheets

PREPARATION OF LEAD-ZIRCONIUM-TITANIUM FILM AND POWDER BY ELECTRODEPOSITION

The United States Government has rights in this invention under Contract No. DE AC36-83CH10093 between the United States Department of Energy and the National Renewable Energy Laboratory, a division of the Midwest Research Institute.

BACKGROUND OF THE INVENTION

I. Field of the Invention

The present invention relates to an electrodeposition process for the preparation of lead-zirconium-titanium film and powder for use in electronic applications and in the formation of lead-zirconium-titanium oxide.

II. Description of the Prior Art

Lead-zirconium-titanium (PZT) powders and films have a significant capability for employment in a myriad of electronic applications and devices. Non-limiting examples of possible direct uses of PZT powder include surface-acoustic wave (SAW) delay lines, pyroelectric sensors, electro-optic displays, ferroelectric field-effect transistors, high-value capacitors, non-volatile memory field-effect transistors, infrared sensors, ultrasonic sensors and optical switches.

Present preparation techniques for the production of PZT powders involve traditional chemical reactions to isolate components, coupled with physical mixing of the component metals. Maintaining product uniformity of resulting powders so prepared is extremely difficult if not realistically impossible. It is therefore apparent, in view of the potential utilities of PZT powders as well as PZT films, that a need is present for an efficient and uniformly productive process for the preparation of PZT films and powders through electrodeposition techniques that deposit all of the precursor components simultaneously while providing atomic-scale mixing that reduces reaction time to the order of minutes to obtain desired phase development.

Accordingly, a primary object of the present invention is to provide a process employing electrodeposition for the production of reactive atomically mixed PZT powder.

Another object of the present invention is to provide a process employing electrodeposition for the preparation of reactive atomically mixed PZT film.

Another object of the present invention is to provide an electrodeposition process wherein PZT powders so produced are recovered either from the electrode-substrate by ultrasonic vibration, for example, or from the bath as a precipitate which has peeled from the electrode-substrate.

Yet another object of the present invention is to provide a PZT powder through an electrodeposition process and thereafter convert the powder to a PZT oxide powder.

Still another object of the present invention is to provide a PZT film through an electrodeposition process and thereafter convert the film to a PZT oxide film.

These and other objects of the present invention will become apparent throughout the description of the invention which now follows.

SUMMARY OF THE INVENTION

The present invention is a process for the preparation of lead-zirconium-titanium (PZT) film and powder compositions. The process comprises the steps of, first of all, providing an electrodeposition bath comprising an electrolyte medium and a cathode substrate electrode, and providing to this bath soluble salts of lead, zirconium and titanium metals. Thereafter, the bath is electrically energized to thereby direct ions of each respective metal in the bath to the substrate electrode to thereby cause formation of metallic and/or reduced particles as a film of PZT. If the electrodeposition process is continued, PZT powder is formed and recovered, as described below. Recovery of PZT film deposited on the substrate electrode can be accomplished by taking the substrate electrode with film thereon from the bath, cleaning the film in an appropriate solvent, and drying it at room temperature.

Recovery of PZT powder can be accomplished by continually energizing the bath to thereby cause powder initially deposited on the substrate-electrode to drop therefrom into the bath from which it is subsequently removed. A second recovery alternative comprises energizing the bath for a period of time sufficient to cause PZT powder deposition on the substrate-electrode only, without subsequent powder drop off. The substrate-electrode thereafter is subjected to a powder removal process such as an ultrasonic environment for example to thereby recover the deposited PZT powder.

PZT film and powder so produced by the electrodeposition methodology described herein can be employed directly in electronic applications, or the film or powder can be subsequently oxidized to thereby produce lead-zirconium-titanium oxide for use in electronic applications. One such process for oxidizing the PZT film and powder is performed by annealing it under favorable ambient conditions for a time and temperature sufficient to accomplish PZT oxide formation. Each of the PZT film and powder formed by electrodeposition exhibits uniformity, enhanced reactivity, reproducibility of content, and is readily usable in a wide range of applications.

DETAILED DESCRIPTION OF THE PREFERRED EMBODIMENT

The preferred embodiment of the present invention is a process for the preparation of lead-zirconium-titanium powder compositions for electronic applications.

EXAMPLE I

An electrodeposition bath containing (1) hydrated metal salts dissolved in dimethylsulfoxide (DMSO-an aprotic electrolyte medium); (2) a cathode silver-foil substrate electrode; (3) a platinum gauze counter electrode; and (4) a silver pseudoelectrode is prepared. To prepare the DMSO-salt solution initially, 3.6 gm $ZrO(NO_3)_2 \cdot xH_2O$, 1.3 gm. $TiCl_3$, and 4.95 gm. $Pb(NO_3)_2$ were dissolved in 450 ml DMSO. (As is evident in this described embodiment, a mixture of DMSO and water, rather than DMSO alone, is the electrolytic solvent since water is introduced when the hydrated starting salts are dissolved in the DMSO.) The bath was energized for 1 to 15 minutes to thereby direct ions of each metal in the bath to the substrate-electrode and cause deposition of metallic particles at the electrode as a PZT film. Deposition temperature was from about 25° C. to about 75° C. The film was cleaned in DMSO, methanol and/or toluene and subsequently dried in open air at room temperature. The film subsequently was recovered from the substrate electrode.

EXAMPLE II

In the same manner as in Example I, a bath was prepared and energized for 1 to 15 minutes to thereby direct ions of each metal in the bath to the substrate-electrode and cause deposition of metallic particles at the electrode as a PZT film. Deposition temperature likewise was from about 25° C. to about 75° C. The film subsequently was recovered as a powder from the substrate-electrode by subjecting the coated substrate-electrode to an ultrasonic environment to thereby cause the PZT composition to dislodge. The recovered powder then was cleaned in DMSO, methanol and/or toluene, and subsequently dried on a hot plate in open air at about 100° C.

EXAMPLE III

In the same manner as in Example I, a bath was prepared and energized, except for a period of 1 to 8 hours, to likewise direct ions of each metal in the bath to the substrate-electrode and cause formation of metallic particles at that electrode. After an adhering film first deposited on and remained with the substrate-electrode, the remainder of the continuing loosely-deposited particles peeled off of the electrode and accumulated as a fine intermixed powder for subsequent recovery at the bottom of the bath. As in Example II, recovered powder then was cleaned in DMSO, methanol and/or toluene, and subsequently dried on a hot plate in open air at about 100° C.

Figure 1:
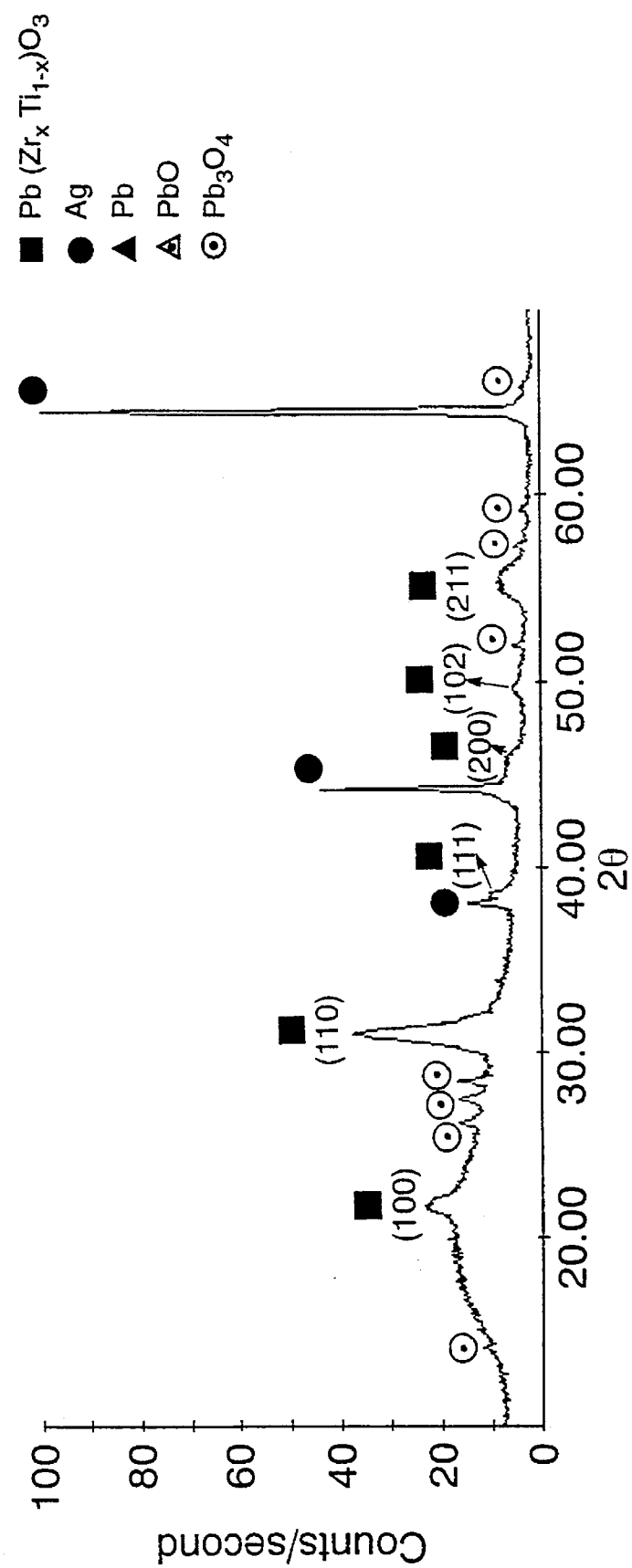
FIG. 1 is a graph showing x-ray analysis of an as-deposited lead-zirconium-titanium (PZT) composition.

In all of Examples I, II and III, the respective film and powder were prepared by applying to the bath either a constant potential in the range of −3V to −5V (vs. silver pseudo reference electrode) or a repeating pulse potential of −4V for 10 seconds, followed by −1V for 10 seconds. The respective deposition rate of each of the elements in the combination under constant potential at steady-state conditions can be represented by the equation $d[M^0]/dt=k_m[M^{n+}]$, where $k_m$ is the potential-dependent rate constant and $[M^{n+}]$ is the electrolyte-solution concentration of the metal ion. Since the deposition rate is directly proportional to the solution concentration, increasing the solution concentration increases the rate of product formation. FIG. 1 shows the as-deposited x-ray characteristics of the PZT powder generated in Examples I, II and III. Peaks of polycrystalline lead and silver (from the silver electrode) are shown. In addition to x-ray analysis, materials were also characterized by electron probe microanalysis and by Auger analysis. Electron probe microanalysis shows the composition of a typical PZT oxide as $PbZr_{0.32}Ti_{0.55}$. The Auger depth profile analysis shows uniform deposition up to a several-micron thickness.

EXAMPLES IV(a)–IV(c)

Figure 2:
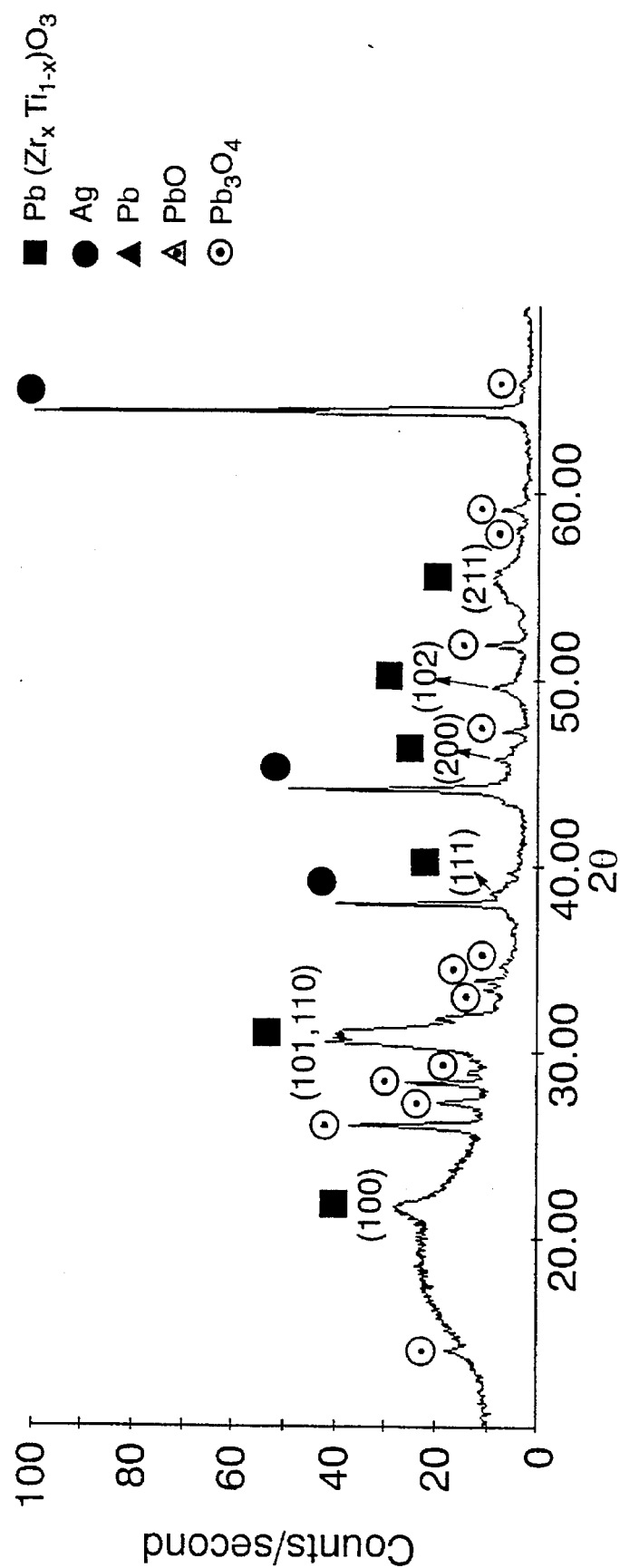
FIG. 2 is a graph showing x-ray analysis of the PZT composition of FIG. 1 after annealing at 375° C. for 10 minutes in oxygen.
Figure 3:
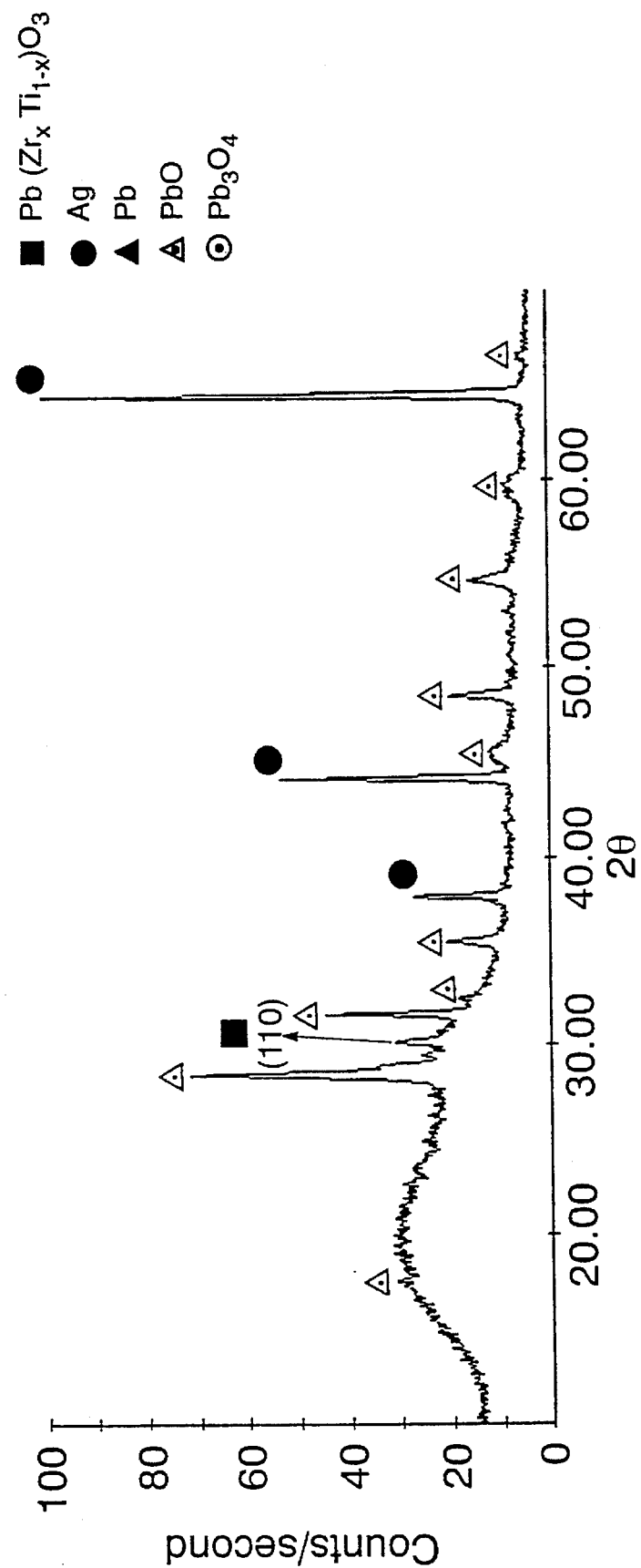
FIG. 3 is a graph showing x-ray analysis of the PZT composition of FIG. 1 after annealing at 475° C. for 10 minutes in oxygen.
Figure 4:
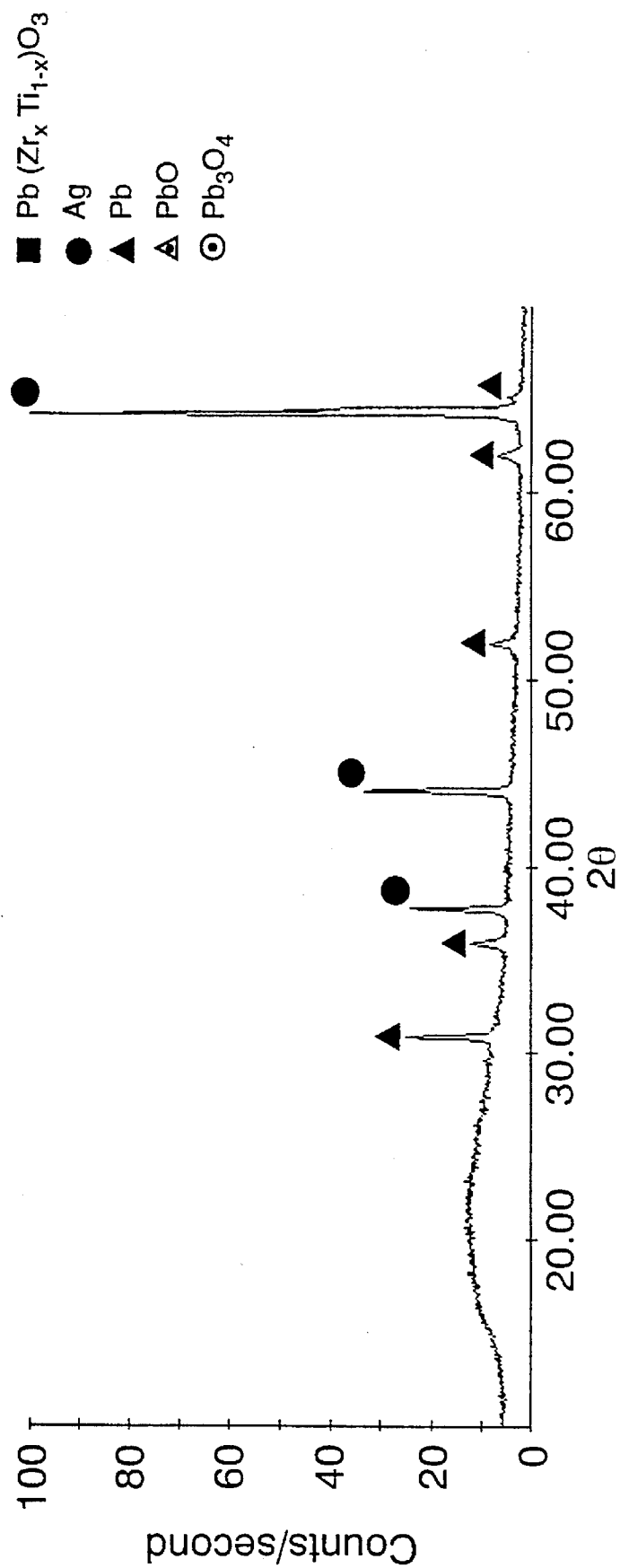
FIG. 4 is a graph showing x-ray analysis of the PZT composition of FIG. 1 after annealing at 575° C. for 10 minutes in oxygen.

FIGS. 2 through 4 illustrate respective x-ray analyses with respect to the formation of PZT oxide through annealing the PZT films and powders as produced in Examples I–III. In particular, FIG. 2 shows x-ray analysis of PZT films and powders annealed at 375° C. for 10 minutes in oxygen and slow cooled (3° C./minute). Peaks of $Pb(Zr_xTi_{1-x})O_3$, PbO and silver (from the electrode) are disclosed. FIG. 3 shows x-ray analysis of PZT films and powders from Example I–III annealed at 475° C. for 10 minutes in oxygen and likewise slow cooled. Peaks of $Pb(Zr_xTi_{1-x})O_3$, $Pb_3O_4$ and silver are disclosed. Finally, FIG. 4 shows x-ray analysis of PZT films and powders from Example I–III annealed at 575° C. for 10 minutes in oxygen and likewise slow cooled. Peaks of $Pb(Zr_xTi_{1-x})O_3$ and, again, silver are shown. PZT films and powders produced by electrodeposition according to the present invention are mixed on an atomic scale and exhibit superior reactivity for subsequent electronic applications apparent to the skilled artisan.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

We claim:

1. A process for the preparation of a lead-zirconium-titanium film, the process comprising the sequential steps of:
    a) providing an electrodeposition bath comprising an electrolyte medium and a cathode substrate electrode;
    b) providing to the bath soluble salts of lead, zirconium and titanium metals;
    c) electrically energizing the bath to thereby direct ions of each respective metal in the bath to the substrate electrode to thereby cause formation of metallic particles as a film of lead-zirconium-titanium on the electrode; and
    d) recovering the film.

2. A process as claimed in claim 1 wherein the soluble salts provided to the bath are lead nitrate, zirconium nitrate and titanium chloride.

3. A process as claimed in claim 1 wherein the bath is electrically energized by applying thereto a constant potential between about −3V and about −5V.

4. A process as claimed in claim 1 wherein the bath is electrically energized by applying thereto a repeating pulse potential.

5. A process as claimed in claim 4 wherein the repeating pulse potential consists of a first potential of about −4V for about 10 seconds followed by a second potential of about −1V for about 10 seconds.

6. A process for the preparation of a lead-zirconium-titanium powder, the process comprising the sequential steps of:
    a) providing an electrodeposition bath comprising an electrolyte medium and a cathode substrate electrode;
    b) providing to the bath soluble salts of lead, zirconium and titanium metals;
    c) electrically energizing the bath to thereby direct ions of each respective metal in the bath to the substrate electrode to thereby cause formation of metallic particles as a film on the electrode;
    d) continually energizing the bath to cause film formed at the electrode to drop as powder from the electrode into the bath; and
    e) recovering the powder from the bath.

7. A process as claimed in claim 6 wherein the soluble salts provided to the bath are lead nitrate, zirconium nitrate and titanium chloride.

8. A process as claimed in claim 6 wherein the bath is electrically energized by applying thereto a constant potential between about −3V and about −5V.

9. A process as claimed in claim 6 wherein the bath is electrically energized by applying thereto a repeating pulse potential.

10. A process as claimed in claim 9 wherein the repeating pulse potential consists of a first potential of about −4V for about 10 seconds followed by a second potential of about −1V for about 10 seconds.

11. A process for the preparation of a lead-zirconium-titanium powder, the process comprising the sequential steps of:
   a) providing an electrodeposition bath comprising an electrolyte medium and a cathode substrate electrode;
   b) providing to the bath soluble salts of lead, zirconium and titanium metals;
   c) electrically energizing the bath to thereby direct ions of each respective metal in the bath to the substrate electrode to thereby cause formation of a film of lead-zirconium-titanium on the electrode; and
   d) removing the electrode from the bath and subjecting the electrode to an ultrasonic environment to thereby ultrasonically remove the powder from the electrode; and
   e) recovering the powder.

12. A process as claimed in claim 11 wherein the soluble salts provided to the bath are lead nitrate, zirconium nitrate and titanium chloride.

13. A process as claimed in claim 11 wherein the bath is electrically energized by applying thereto a constant potential between about −3V and about −5V.

14. A process as claimed in claim 11 wherein the bath is electrically energized by applying thereto a repeating pulse potential.

15. A process as claimed in claim 14 wherein the repeating pulse potential consists of a first potential of about −4V for about 10 seconds followed by a second potential of about −1V for about 10 seconds.

16. A process for the preparation of lead-zirconium-titanium oxide powder, the process comprising the sequential steps of:
   a) providing an electrodeposition bath comprising an electrolyte medium and a cathode substrate electrode;
   b) providing to the bath soluble salts of lead, zirconium and titanium metals;
   c) electrically energizing the bath to thereby direct ions of each respective metal in the bath to the substrate electrode to thereby cause formation of a film of lead-zirconium-titanium on the electrode; and
   d) removing the electrode from the bath and subjecting the electrode to an ultrasonic environment to thereby ultrasonically remove the powder from the electrode;
   e) recovering the powder; and
   f) annealing the powder in flowing oxygen for a time sufficient and at a temperature sufficient to produce lead-zirconium-titanium oxide.

17. A process as claimed in claim 16 wherein the soluble salts provided to the bath are lead nitrate, zirconium nitrate and titanium chloride.

18. A process as claimed in claim 16 wherein the bath is electrically energized by applying thereto a constant potential between about −3V and about −5V.

19. A process as claimed in claim 16 wherein the bath is electrically energized by applying thereto a repeating pulse potential.

20. A process as claimed in claim 19 wherein the repeating pulse potential consists of a first potential of about −4V for about 10 seconds followed by a second potential of about −1V for about 10 seconds.

21. A process for the preparation of a lead-zirconium-titanium oxide film, the process comprising the sequential steps of:
   a) providing an electrodeposition bath comprising an electrolyte medium and a cathode substrate electrode;
   b) providing to the bath soluble salts of lead, zirconium and titanium metals;
   c) electrically energizing the bath to thereby direct ions of each respective metal in the bath to the substrate electrode to thereby cause formation of metallic particles as a film of lead-zirconium-titanium on the electrode;
   d) recovering the film; and
   e) annealing the film in flowing oxygen for a time sufficient and at a temperature sufficient to produce lead-zirconium-titanium oxide.

22. A process as claimed in claim 21 wherein the soluble salts provided to the bath are lead nitrate, zirconium nitrate and titanium chloride.

23. A process as claimed in claim 21 wherein the bath is electrically energized by applying thereto a constant potential between about −3V and about −5V.

24. A process as claimed in claim 21 wherein the bath is electrically energized by applying thereto a repeating pulse potential.

25. A process as claimed in claim 24 wherein the repeating pulse potential consists of a first potential of about −4V for about 10 seconds followed by a second potential of about −1V for about 10 seconds.

26. A process as claimed in claim 11 wherein the powder is annealed in flowing oxygen for a time sufficient and at a temperature sufficient to produce lead-zirconium-titanium oxide.

* * * * *

UNITED STATES PATENT AND TRADEMARK OFFICE
CERTIFICATE OF CORRECTION

PATENT NO. : 5,462,647

DATED : October 31, 1995

INVENTOR(S) : Raghu N. Bhattacharya et al.

It is certified that error appears in the above-identified patent and that said Letters Patent is hereby corrected as shown below: In the drawings:

Change Figure 1 to Read Figure 4;

Change Figure 2 to read Figure 3;

Change Figure 3 to read Figure 2; and

Change Figure 4 to read Figure 1.

Signed and Sealed this

Thirtieth Day of April, 1996

Attest:

BRUCE LEHMAN

*Attesting Officer*  *Commissioner of Patents and Trademarks*